US008260925B2

(12) United States Patent
Chen et al.

(10) Patent No.: US 8,260,925 B2
(45) Date of Patent: Sep. 4, 2012

(54) FINDING WORKABLE VIRTUAL I/O MAPPINGS FOR HMC MOBILE PARTITIONS

(75) Inventors: Ping Chen, Austin, TX (US); Robert K. Foster, Austin, TX (US); Yiwei Li, Austin, TX (US); Elizabeth A. Ruth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 12/266,916

(22) Filed: Nov. 7, 2008

(65) Prior Publication Data

US 2010/0122124 A1    May 13, 2010

(51) Int. Cl.
*G06F 15/173* (2006.01)
*G06F 13/00* (2006.01)
*G06F 9/46* (2006.01)
(52) U.S. Cl. .................. 709/226; 710/104; 718/104
(58) Field of Classification Search .................. 709/226; 718/106
See application file for complete search history.

(56) References Cited

U.S. PATENT DOCUMENTS

| | | | |
|---|---|---|---|
| 6,775,673 | B2 | 8/2004 | Mahalingam et al. |
| 7,673,031 | B1 * | 3/2010 | Jalagam et al. ............... 709/223 |
| 2003/0204648 | A1 | 10/2003 | Arndt |
| 2005/0076155 | A1 * | 4/2005 | Lowell ............................. 710/1 |
| 2005/0091365 | A1 * | 4/2005 | Lowell et al. ................. 709/224 |
| 2008/0168461 | A1 | 7/2008 | Arndt et al. |

OTHER PUBLICATIONS

Bill Adra, Tae-Hun Lee, Chris Milsted, Lars G. Hopner Petersen, Stanley Wood "IBM System p Advanced POWER Virtualization Best Practices", International Technical Support Organization, IBM, Oct. 2006.*
W. J. Armstrong, R. L. Arndt, T. R. Marchini, N. Nayar, W. M. Sauer "IBM POWER6 partition mobility: Moving virtual servers seamlessly between physical systems", IBM J. Res. & Dev. vol. 51, No. 6 Nov. 2007.*
Catherine Anderson "Best Practice Library. Guidelines for Installing Hitachi HiCommand® Dynamic Link Manager and Multi-Path I/O in a Virtual I/O Environment", Hitachi Data Systems, Nov. 2006.*
Dana French "Virtualization Standards for Business Continuity: Part 8", Mt Xia, Inc., 2007.*
Hwang YT, et al., "A Unified Partitioning and Scheduling Scheme for Mapping Multistage Regular Iterative Algorithms Onto Processor Arrays," Journal of VLSI Signal Processing, 1995, V 11, N1-2, pp. 133-150.
Tsai, L.J., et al., "An Implementation of Disk Objects in the Logical Machine Monitor," Software-Practice & Experience, 1997, V 27, N11, pp. 1335-1348.
Schwederski, Thomas, et al., "Task Migration Transfers in Multistage Cube Based Parallel Systems," 1989 International Conference on Parallel Processing, University Park, PA, 1989, pp. 1-296-1-305.

(Continued)

*Primary Examiner* — Boris Gorney
(74) *Attorney, Agent, or Firm* — Stephen J. Walder, Jr.; Libby Z. Toub

(57) ABSTRACT

In one embodiment, a data structure stores information about the number of client virtual I/O adapters, the number of possible destination VIOS hosts and the number of available slots on those hosts. The information is used to iteratively assign adapters to available slots of the VIOS hosts of the destination server to which a client partition is to be migrated. A method comprises testing the data structure to determine whether conditions exist that make allocation of the adapter to a VIOS host unquestionable.

21 Claims, 6 Drawing Sheets

OTHER PUBLICATIONS

W. J. Armstrong, et al., "IBM Power 6 Partition Mobility: Moving Virtual Servers Seamlessly Physical Systems," IBM Journal of Research and Development, 2007, vol. 51, No. 6, pp. 757-762.

Mahanti, Anirban, et al., "Adaptive Data Parallel Computing on Workstation Clusters," Journal of Parallel and Distributed Computing, 2004, pp. 1241-1255.

* cited by examiner

FINDING WORKABLE VIRTUAL I/O MAPPINGS FOR HMC MOBILE PARTITIONS

BACKGROUND

This written description is in the field of migration of client partitions within a system of servers. More particularly, the description relates to using a Hardware Management Console (HMC) to allocate client adapters on the migrating partition to Virtual Input/Output (I/O) Server (VIOS) slots of a destination server.

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, in a modern system, a plurality of computers—including servers—are connected together through a network. Each computer may run application programs for performing certain functions. These application programs may include word-processing, e-mail, graphics, document viewing and mark-up, spreadsheet, database, music player, internet browser, photo-shop, games, anti-virus, as well as a host of other application programs too numerous to mention.

Servers are provided to connect a plurality of computers to the Internet or an intranet. Each server may be logically partitioned into a plurality of virtual clients which act and appear to a computer connected to the server as if the virtual client is itself a server. Each virtual client has access to physical storage external to the server through a Storage Area Network (SAN). To provide this access a Power Hypervisor (PHYP) controls access of each virtual client to the physical storage through a Virtual Input/Output Server (VIOS), which is itself a logical partition.

Disks and optical devices attached to a physical adapter connected to the Virtual I/O Server (VIOS) logical partition can be shared by one or more client logical partitions. The VIOS host may be a standard storage subsystem that provides standard Small Computer Service Interface (SCSI)-compliant Logical Unit Numbers (LUN). The VIOS host is capable of exporting a pool of heterogeneous physical storage as a homogeneous pool of block storage in the form of SCSI disks.

In some systems comprising a plurality of servers, with each server capable of hosting a client partition, it is sometimes desirable to transfer (migrate) a running client partition from one server to another. This may be done to balance a load among the servers or for maintenance, for example. A client partition can be migrated only if it meets a set of requirements, one of which allows it to have I/O adapters that are only of the virtual type, for example virtual SCSI or virtual fibre channel adapters, that access physical disk storage through VIOS partitions on a SAN. No physical I/O is allowed. Then for a migration to succeed, each virtual SCSCI or virtual fibre channel adapter associated with the client partition must be assigned to a VIOS host on the destination server that is also capable of the same physical device access. (Note, the migration will fail if this can't be achieved.) Not all adapters can be hosted on every VIOS host. For example, some destination VIOS partitions may not map to the same physical storage as the source VIOS host, while some VIOS hosts may map to the same physical storage, but not have enough available slots. One method to map a set of client adapters to a set of VIOS hosts on the destination server is to try every adapter-host combination in some order until all adapters are resolved (assigned) to a destination VIOS host.

BRIEF SUMMARY

One embodiment is a system for allocating adapters associated with a client to VIOS hosts of a destination server to which the client is to be migrated. The system comprises a memory to store a data structure. The data structure comprises, for each adapter and for each VIOS host that may possibly support the adapter, the number of adapters per VIOS host, the number of available slots per VIOS host, and a weight which is equal to the number of adapters per VIOS minus the number of available slots per VIOS host. The system also comprises a processor to assign adapters to VIOS hosts and to maintain the data structure according to a set of rules. The rules comprise: (a) if an adapter can be resolved by only one VIOS host, then assigning the adapter to the one VIOS host, reducing by one the possible number of adapters for the VIOS host, and reducing by one the number of available slots for the VIOS host; and (b) if a weight is less than or equal to zero for a particular VIOS host (which means that the VIOS host has enough slots to host all of its possible adapters), then assigning all the adapters to the particular VIOS host, reducing the number of adapters needing resolution for all other VIOS partitions that could have hosted the same adapters, and then recalculating weights for the remaining VIOS partitions that could have hosted those adapters.

Another embodiment is a method for allocating adapters of a client to be migrated to a destination server having one or more destination VIOS hosts that can possibly host one or more of the adapters. The method comprises providing and manipulating a data structure. The data structure comprises, for each adapter and for each VIOS host that may possibly support the adapter, the number of adapters per VIOS host, the number of available slots per VIOS host, and a weight that is equal to the number of adapters per VIOS host minus the number of available slots per VIOS host. The method comprises determining, for an adapter if there is only one VIOS host that can host the adapter. If so, then the method comprises assigning the adapter to the one VIOS host, reduce by one the possible number of adapters for the one VIOS host, and reduce by one the available slots of the one VIOS host. The method further comprises determining if a weight for a particular VIOS host is zero or less than zero (meaning that the VIOS host has enough slots to host all of its possible adapters). If so, then the method comprises assigning all the adapters to the particular VIOS host; reducing the total number of adapters needing resolution for all other VIOS hosts that could also have resolved the adapters; and then recalculating a weight for those remaining VIOS hosts that could have hosted those adapters.

Another embodiment of the invention provides a computer program product containing instructions effective, when executing in a data processing system, to cause the system to perform a series of operations for assigning adapters to destination VIOS hosts. The operations comprise maintaining a data structure in a memory of the computer. The data structure comprises, for each adapter of a client to be migrated from a source server to a destination server, the number of destination VIOS hosts that can support that adapter, and for each VIOS host of the destination server that may possibly support the adapters, the total number of adapters that can possibly be hosted per VIOS host, the number of available slots per VIOS host, and a weight that is equal to the number of adapters per VIOS host minus its number of available slots. The operations comprise performing the following steps: (a) if an adapter can be resolved by only one VIOS host, then assigning the adapter to the one VIOS host, reducing by one the possible number of adapters for the VIOS host, reducing by one the number of available slots for the VIOS host; and (b) if a weight is less than or equal to zero for a particular VIOS, then assigning all the adapters to the particular VIOS host, reducing the total number of adapters possibly hosted by all other VIOS partitions that could have hosted the resolved adapters, and then recalculating weights for those remaining VIOS partitions that could have hosted those adapters.

BRIEF DESCRIPTION OF THE SEVERAL VIEWS OF THE DRAWINGS

Advantages will become apparent upon reading the following detailed description and upon reference to the accompanying drawings in which, like references may indicate similar elements.

DETAILED DESCRIPTION OF EMBODIMENTS

The following is a detailed description of example embodiments depicted in the accompanying drawings. The example embodiments are described in detail. However, the amount of detail offered is not intended to limit the anticipated variations of embodiments; but, on the contrary, the intention is to cover all modifications, equivalents, and alternatives falling within the spirit and scope of the appended claims. The detailed description below is designed to render various embodiments obvious to a person of ordinary skill in the art.

Systems, methods and media for mapping adapters to destination VIOS hosts are disclosed. In one embodiment, the system comprises a data structure for storing information about the number of available hosts and slots. The information is used to iteratively assign adapters to available slots of the VIOS hosts of the destination server to which a client partition is to be migrated. A method comprises testing the data structure to determine whether conditions exist that make allocation of the adapter to a VIOS unquestionable.

Figure 1:
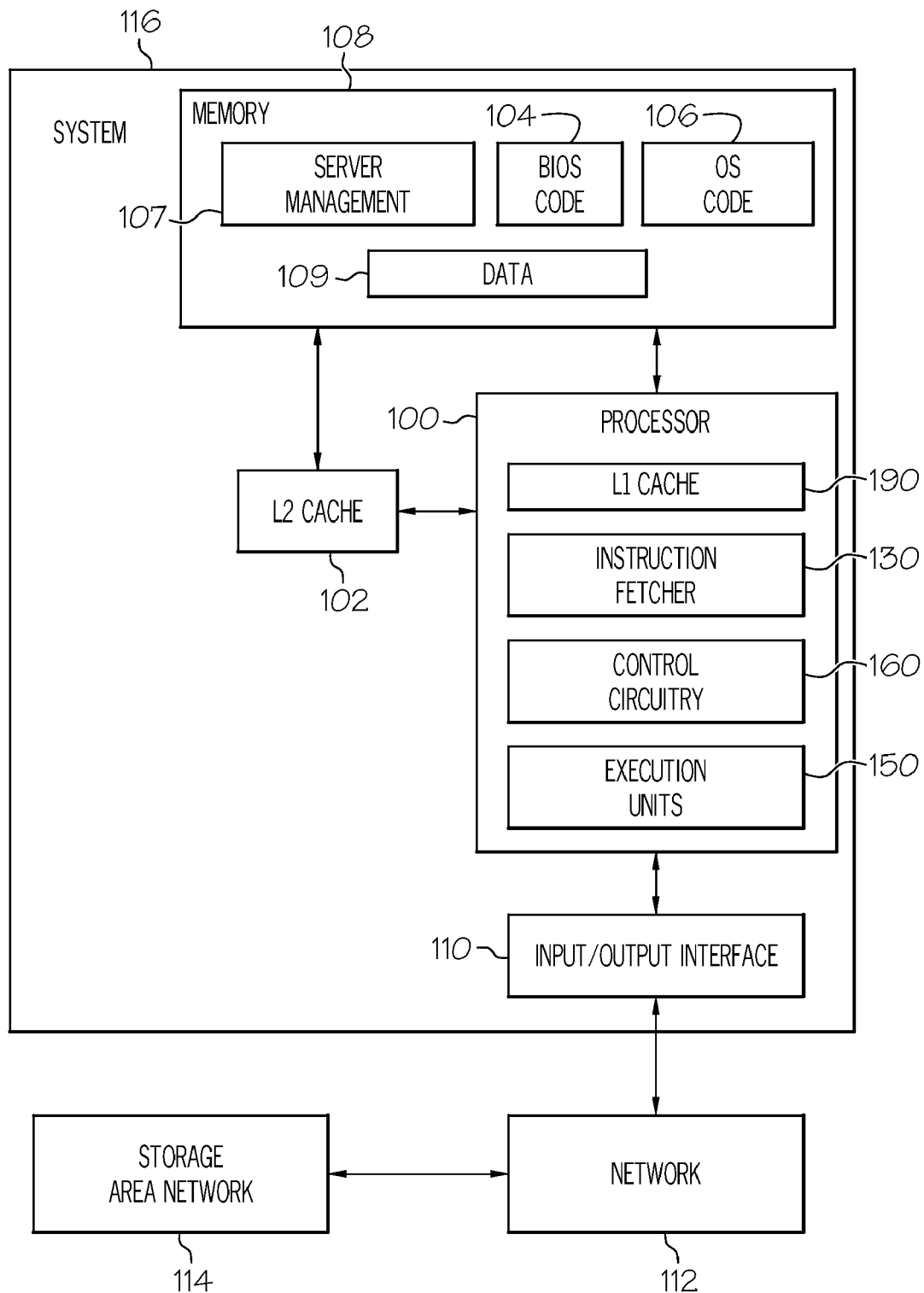
FIG. 1 depicts an embodiment of a system capable of performing the functions of a Hardware Management Console (HMC) that assigns adapters of a client to VIOS hosts of a destination server to which the client is to be migrated.

FIG. 1 shows a computing system 116 (herein sometimes referred to as a machine). System 116 may be a server, a computer, or a Hardware Management Console (HMC). System 116 comprises at least one processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of server 116. Digital system 116 comprises a level 2 (L2) cache 102 located physically close to processor 100. Memory 108 also stores other programs for execution by processor 100 and stores data 109.

Figure 4A:
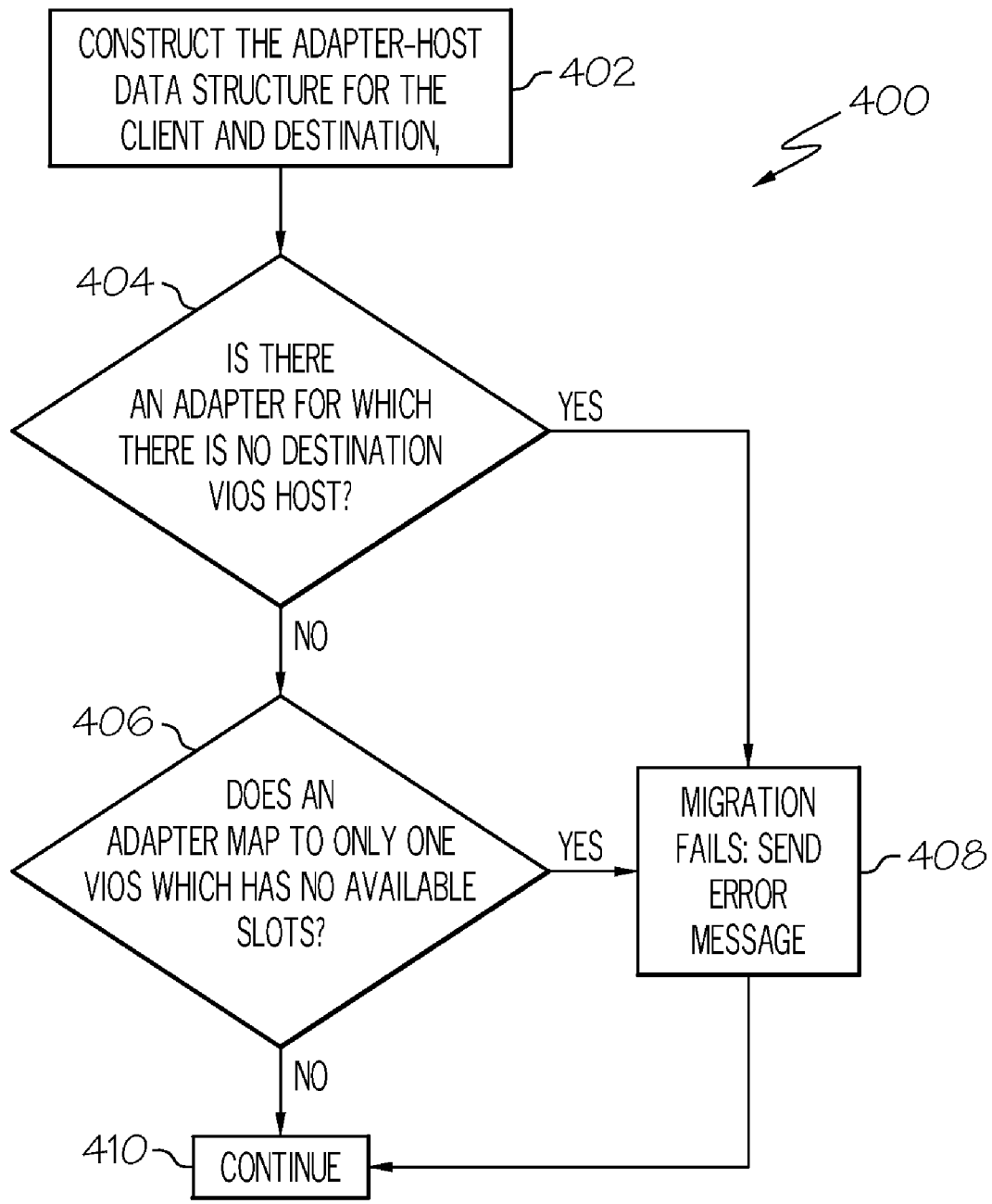
FIG. 4A depicts a flowchart of an embodiment for testing preliminary conditions which indicate whether an adapter cannot be resolved.

In an embodiment of system 116 used as an HMC, memory 108 stores server management code 107 to allocate adapters to VIOS hosts as will be explained herein. Memory 109 comprises a data structure comprising information about the adapters (where they map to in physical memory) and about the destination hosts (where they map to and how many available slots they have). In a first phase of operation, the code 107, when executed by processor 100, causes steps to be performed that comprise testing for two conditions. The first condition is, can the adapter in question be hosted by only one VIOS. If this condition is true, then the adapter in question is resolved to the relevant VIOS and the data structure is updated to reflect the current resolution of the adapter. The second condition is: does any given VIOS have a weight of zero or less? If this condition is true, then the VIOS has enough available slots to host all of its possible adapters. They are all, therefore, resolved to the VIOS, and the data structure is updated to reflect this resolution of these adapters (note that updating the data structure means that these adapters are essentially removed). This will become clear in the discussion that relates to FIGS. 4A-4C.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. In one embodiment, these instructions include instructions to identify a key set or key set group named by an interface module. The instructions cause processor 100 to determine if the requesting application program is authorized to receive the requested keys. The instructions further cause processor 100 to retrieve the requested keys from a key store and to thereby produce a map of the keys.

Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to implement an encryption key management process.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

System 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Processor 100 may also communicate with a network 112 by way of Input/Output Device 110. The network connects system 116 with a storage area network of physical memory storage devices 114. These devices may include tape drive storage or hard disk arrays or other types of memory.

Thus, in one mode of operation of system 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Each of the units of execution units 150 may be adapted to execute a specific set of instructions. Instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

A system 116 will have its own memory for storing its operating system, BIOS, and the code for executing application program and encryption key processing code, as well as files and data. The memory of a server comprises Read-Only-Memory (ROM), cache memory implemented in DRAM and SRAM, a hard disk drive, CD drives and DVD drives. A server also has its own memory and may control access to other memory such as tape drives and hard disk arrays. Each server may store and execute its own application programs. Thus, some application programs, such as databases, may reside in the server and these programs may be available to computers in the network.

System 116 used as a server may store computer code to perform the various functions of the server, including, forming logical partitions (LPAR), emulating virtual clients which may each appear as a server to external devices such as computers in the network, emulating a Power Hypervisor (PHYP), and a Virtual I/O Server (VIOS).

Figure 2:
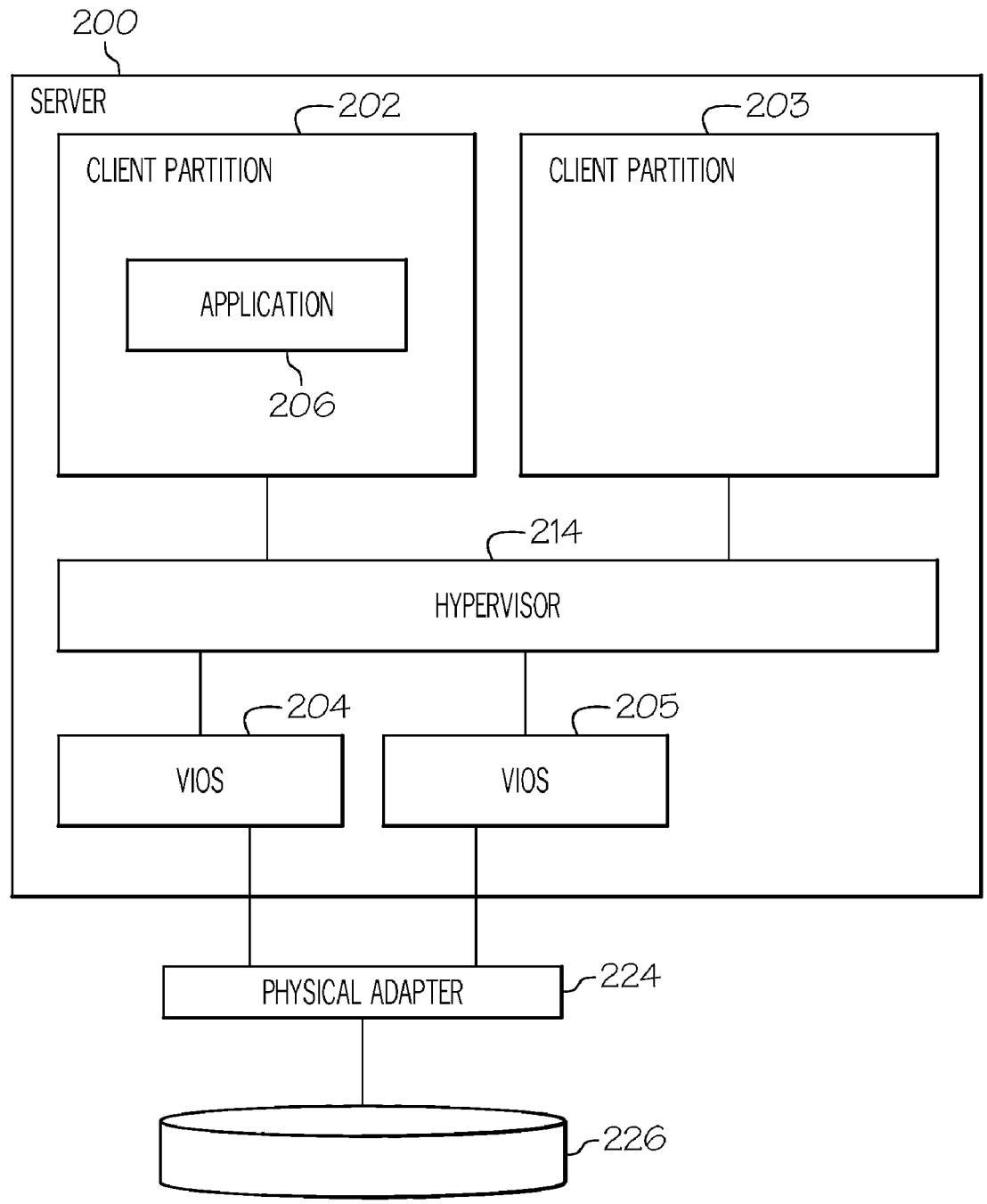
FIG. 2 depicts an embodiment of a server with multiple client partitions and multiple VIOS hosts.

FIG. 2 shows a logical representation of a server 200 emulating a plurality of virtual clients (client partitions) 202, 203, a hypervisor 214 and a first VIOS 204 and second VIOS 205 to manage the allocation of storage to the virtual clients and to handle data transfer to or from the physical storage 226.

Thus, a virtual client 202 is a logical partition of server 200. Virtual client 202 performs its functions by way of the execution of computer code by the processor of server 200. Thus, the functions of an application 206 associated with virtual client 202 may be performed. For example, virtual client 202 may comprise database functions so that it appears to be a database accessible by a computer in the network.

VIOS 204 is software that is associated with a logical partition of server 200. This software facilitates the sharing of physical I/O resources between the client logical partitions 202 within server 200. VIOS 204 provides virtual Small Computer System Interface (SCSI) target and Shared Ethernet Adapter capability to client logical partitions within the system, allowing the client logical partitions to share SCSI devices and Ethernet adapters. VIOS 204 software requires that the logical partition be dedicated solely for its use. Disks 226 and optical devices attached to a physical adapter 224 are accessible by the VIOS 204, 205.

The Virtual I/O Server provides standard SCSI-compliant Logical Unit Numbers (LUN). The Virtual I/O Server is capable of exporting a pool of heterogeneous physical storage as a homogeneous pool of block storage in the form of SCSI disks. Physical disks owned by the Virtual I/O Server can be either exported and assigned to a client logical partition as a whole or can be partitioned into logical volumes. The logical volumes can then be assigned to different partitions.

Hypervisor 214 is between the virtual clients 202, 203 and VIOS 204, 205. Hypervisor 214 acts as a memory manager controlling access to memory and security functions to protect data in memory of a first virtual client from being accessed by a second virtual client. Hypervisor 214 contains a record of which memory of storage 226 is allocated to which virtual client 202 and what memory is available to be allocated to a virtual client. Hypervisor 214 also controls time slicing, management of all hardware interrupts, dynamic movement of resources across multiple operating systems, and dispatching of logical partition workloads. Thus, the client on a source server starts out with the client connected to a VIOS by way of virtual adapters (e.g., vscsi, vfc (virtual fiber channel)). Each adapter provides access to physical storage to the client. Once migration is complete, the migrated client is connected by virtual adapters of VIOS hosts on the destination server. These virtual adapters give the migrated client access to the same storage area network and same physical storage as it had before the migration.

Figure 3:
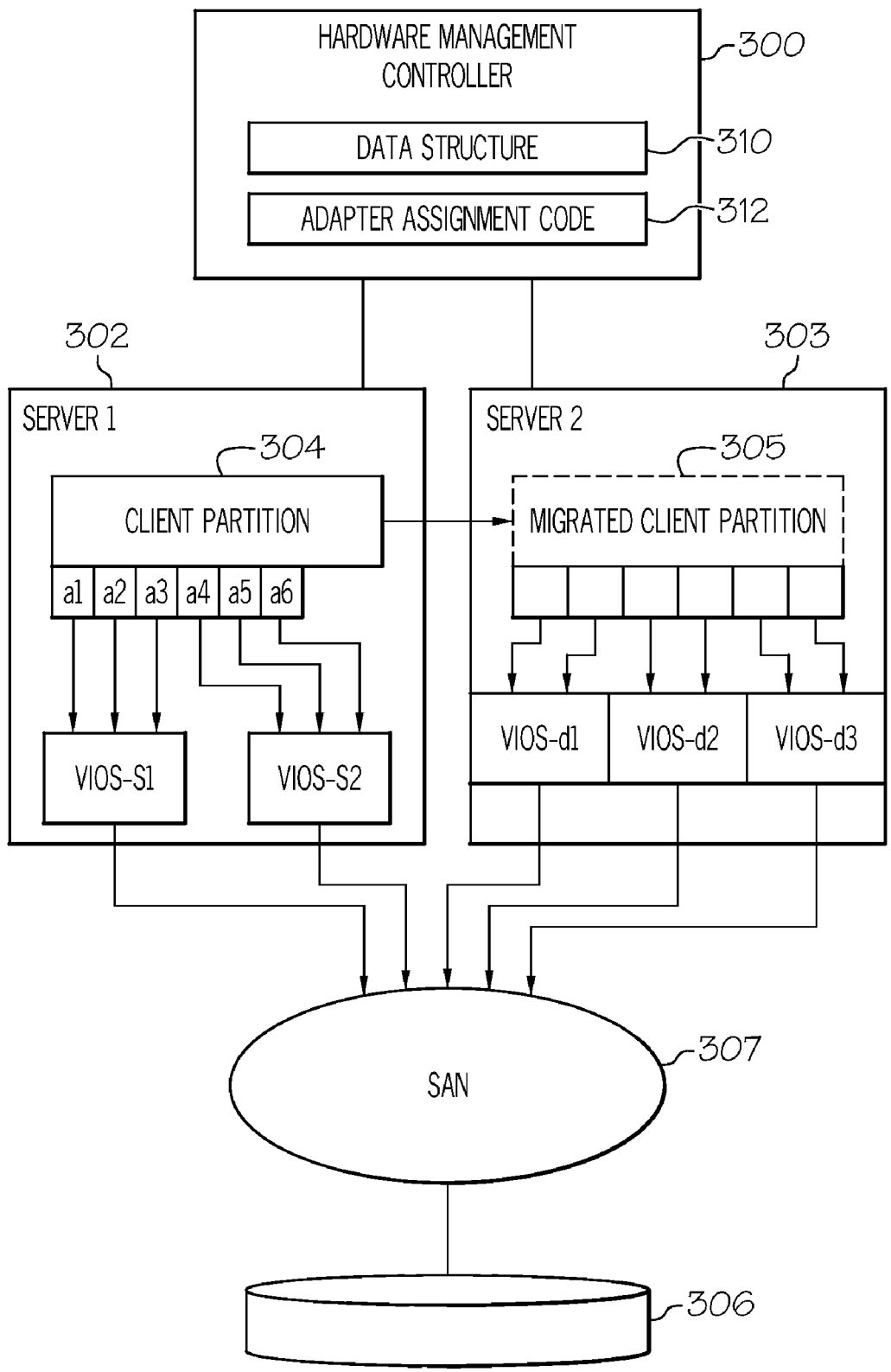
FIG. 3 depicts an HMC that controls a plurality of servers and controls the assignment of client adapters to destination VIOS hosts.

FIG. 3 shows a simplified diagram of two servers 302, 303 operating under the directions of a Hardware Management Console (HMC) 300. HMC 300 enables an administrator to control the servers with respect to the creation, maintenance, and migration of logical partitions. The logical partitions comprise client partitions and VIOS partitions. The types of partitions may include, for example, AIX, Linux, i5/OS, and VIOS. VIOS partitions can also have added functionality for paging and/or partition migration—for example, Paging Space Partitions (PSPs) for shared memory partition paging and MSP's, which serve as 'mover service partitions' for active partition migration. VIOS partitions, themselves cannot be migrated. For example, an administrator may want to migrate a client partition 304 from server 1 to server 2. HMC 300 comprises code that executes by a microprocessor to enable a user to instruct servers 1 and 2 to cause the migration to occur. HMC 300 also comprises adapter assignment code 312 that maintains a data structure 310, and assigns adapters to destination VIOS hosts according to the methods described herein. For a migration to be successful, the system performs a mapping of the adapters (a1-a6) of a client partition to be migrated to the available slots of one or more VIOS (d1-d3). Although six adapters on the client partition and 3 VIOS are shown on the destination server, different numbers of adapters and VIOS are also contemplated.

As shown in FIG. 3 a client partition 304 may be on server 1 (302) and/or migrated such as migrated client partition 305 on server 2 (303). Each adapter a1-a6 of client partition 304 maps to a different segment of an external storage 306 through source VIOS host S1 and S2. Storage 306 is also accessible by the VIOS hosts d1-d3 of server 2. A problem solved by present embodiments is one of finding a good mapping of the adapters a1-a6 to the available slots of the VIOS hosts d1-d3. The complexity of this task lies in the simple mathematics behind the possibility of having to check all possible combinations of client adapters to possible destination VIOS hosts for sufficient available slot capacity, which leads to exponential growth in the number of operations required as the number of adapters and/or destination VIOS host choices increases. So with an exhaustive combinations checking algorithm, the performance of a given migration validation could very quickly become unacceptable.

To illustrate the problems of a pure combinations search, consider a simple configuration of two possible VIOS hosts on the destination side (server 2). Clearly, the problem of mapping can quickly become a performance problem as the number of virtual I/O client adapters on the migrating partition (server 1) increases upwards to 20 adapters and beyond. If, for example, a checking operation takes 1 millisecond, then the number of checking operations that could be done in one day is: 1000 operations*60 seconds*60 minutes*24 hours=86,400,000 operations. With two destination VIOS hosts that 20 adapters can possibly be hosted by, to exhaust all the combinations of the 20 adapters to the 2 VIOS hosts, it would take 2**20 operations, which is 1,048,576 combinations to perform the checking operations against the number of available VIOS slots. To determine what percentage of the day that would take, divide the 1,048,576 combinations by the 86,400,000 operations possible in one day—which gives 0.012 days—which is 0.28 hours—or a little more than 15 min. If one calculated the amount of time required for checking the number of combinations one obtains with 25 adapters, the result is more than 9 hours, and with 27 client adapters, one gets more than 1.5 days—and this is with only two possible VIOS host partitions. The performance problem becomes much worse when the number of destination VIOS host partitions increases.

Thus, one desires a good mapping of adapters to available slots that does not take so much time to determine. A good mapping is one that results in resolution of all adapters. To achieve a good mapping quickly, intelligence is introduced to a process of resolving the adapters by creating an identification of 'unquestionably resolvable' adapters. Unquestionably resolvable adapters are those adapters that satisfy either one of two criteria: (a) an adapter may be resolved to only one VIOS or (b) an adapter can be resolved to a destination VIOS host that has a weight that is less than or equal to zero (meaning that the VIOS has enough slots to host all of its possible adapters). These identified mapping of client adapters to VIOS hosts are not questionable. A 'questionable' resolution—when looking at which destination VIOS hosts could possibly host a single adapter—would be one, for example, where client adapter a1 could be hosted by destination VIOS partitions d1 or d2 (based on the ability of those VIOS partitions to access the same physical device space). Another 'questionable' resolution would be one where VIOS host d1 could possibly host adapters a1, a2, a3, and a4, but host d1 has only two available slots.

Embodiments may therefore iteratively resolve the 'unquestionably resolvable' adapters. The system then works with the trimmed-down list of adapters that are not unquestionably resolvable according to the above criteria. Using the exhaustive combinations approach the system attempts to resolve remaining adapters. If all adapters cannot ultimately be resolved, the migration must fail. This will become clear when discussing the example given below.

A data structure 310 of data for the adapters is constructed. The data structure comprises: (1.) Adapter name, (2.) Number of possible VIOS hosts per adapter, (3.) Number of possible adapters per VIOS host, (4.) Number of available slots per VIOS host, and (5.) Weight per VIOS host (# adapters supported minus # available slots). For each destination VIOS partition, the system gathers the list of client adapters it can host. (Note: The information on which adapters can be hosted by a VIOS partition is based on the get adapter/find devices commands issued to the VIOS partitions to determine if the same physical device space can be accessed by the destination VIOS. This information, however, is independent of the slot capacity of the destination VIOS, which also is important.)

Consider an example. Suppose the number of destination VIOS hosts, the adapters supported by each, and the number of available slots in each is as follows:

| Destination VIOS Host | Adapters supported | # Available Slots |
|---|---|---|
| d1: | a0, a3, a5 | 1 |
| d2: | a0, a1, a3, a4, a6 | 2 |
| d3: | a2, a5, a6 | 2 |
| d4: | a1, a5 | 2 |

This data can be restated as follows:

| Client Adapter | Possible Destination Hosts |
|---|---|
| a0: | d1, d2 |
| a1: | d2, d4 |
| a2: | d3 |
| a3: | d1, d2 |
| a4: | d2 |
| a5: | d1, d3, d4 |
| a6: | d2, d3 |

Re-tabulating this data yet again, one obtains the following table of values:

| A ADAPTER | B # Possible VIOS Hosts | C Possible # of adapters per VIOS | D Available slots per VIOS host | E Weight per VIOS host (E = C − D) |
|---|---|---|---|---|
| a2 | 1 | 3(d3) | 2(d3) | 1(d3) |
| a4 | 1 | 5(d2) | 2(d2) | 3(d2) |
| a0 | 2 | 3(d1) | 1(d1) | 2(d1) |
|    | 2 | 5(d2) | 2(d2) | 3(d2) |
| a1 | 2 | 5(d2) | 2(d2) | 3(d2) |
|    | 2 | 2(d4) | 2(d4) | 0(d4) |
| a3 | 2 | 3(d1) | 1(d1) | 2(d1) |
|    | 2 | 5(d2) | 2(d2) | 3(d2) |
| a6 | 2 | 5(d2) | 2(d2) | 3(d2) |
|    | 2 | 3(d3) | 2(d3) | 1(d3) |

-continued

| A ADAPTER | B # Possible VIOS Hosts | C Possible # of adapters per VIOS | D Available slots per VIOS host | E Weight per VIOS host (E = C − D) |
|---|---|---|---|---|
| a5 | 3 | 3(d1) | 1(d1) | 2(d1) |
|  | 3 | 3(d3) | 2(d3) | 1(d3) |
|  | 3 | 2(d4) | 2(d4) | 0(d4) |

This is the adapter-host data structure that is stored by the HMC 300 for this example.

Using this adapter-host data structure 310, HMC 300 will resolve and eliminate from the structure all resolvable adapters. This will be explained below. First, however, HMC 300 will look for two catastrophic failure conditions that would cause the whole search to fail. This is shown in the flowchart 400 of FIG. 4A. At element 402, the HMC constructs the adapter-host data structure for the client and destination. The process tests for the following conditions:

(1.) (element 404) The existence of an adapter that has 0 possible destination VIOS hosts; or (2.) (element 406) The existence of an adapter that has only 1 possible destination host—the available slots for which equals 0. In this case, everything associated with the non-functional VIOS must be eliminated from the adapter information, and that adapter's number of possible VIOS hosts value must be reduced by one for each non-functional VIOS. Thus, the HMC will also perform cleanup and adjustments for any adapter associated with a non-functional VIOS.

If either preliminary condition (1) or preliminary condition (2) occurs, the migration fails and an error message is sent from a subroutine for testing the two conditions (element 408). If neither condition is detected, the process continues (element 410). Note that in some embodiments, the step of constructing the data structure is performed after testing for the above-given two conditions.

If neither preliminary condition (1) or (2) occurs, the HMC will assign adapters to the destination VIOS host partitions where there is a clear solution. This includes 2 primary conditions of adapter resolution with the stated adjustments for each case:

a) Adapters that have only a single possible destination VIOS: When an adapter is resolved for this reason, and if other adapters exist that can be hosted by the same VIOS host, the following values for those adapters have to be adjusted (hereafter, adjustments A) by reducing by one the number of possible adapters for the VIOS and reducing by one the available slots for the VIOS host.

b) Every adapter that can be hosted by a destination VIOS host that has enough (or more than enough) available slots to host all of its possible adapters: When an adapter is resolved for this reason, there will be no other adapters that can be hosted by the same VIOS host (we've resolved all of its adapters). The values for any other VIOS hosts that could also have hosted the resolved adapter must be adjusted (hereafter, adjustments B). For VIOS hosts that fit into this category, adjustment B includes reducing by one the number of possible adapters per VIOS host. This further requires adjustment of the weight value for that VIOS host and adapter. (Note that other VIOS host adjustments didn't have to be considered for the 1st case since there was only a single VIOS host.)

Figure 4B:
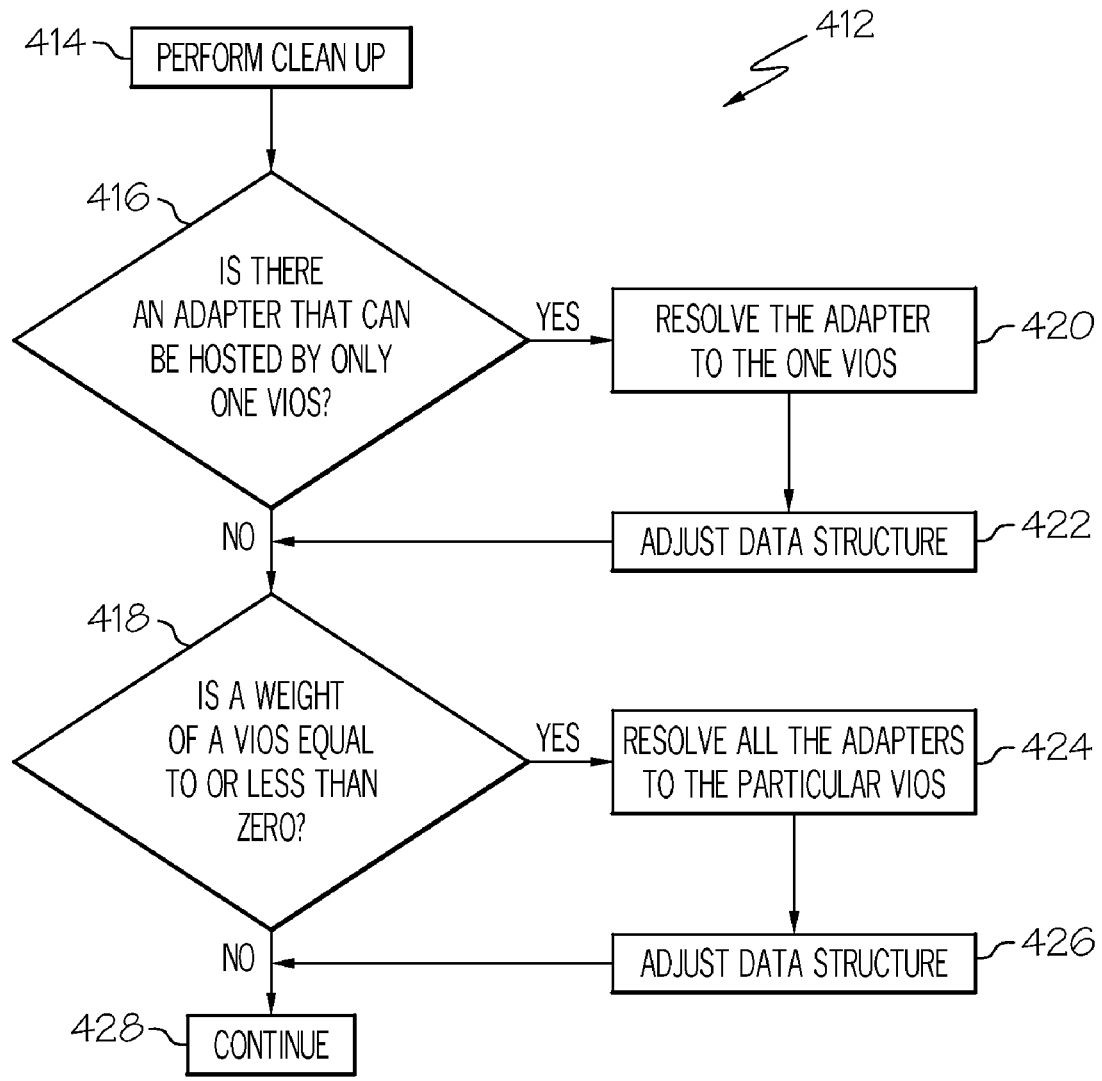
FIG. 4B depicts a flowchart of an embodiment for resolving adapters according to two primary conditions.
Figure 4C:
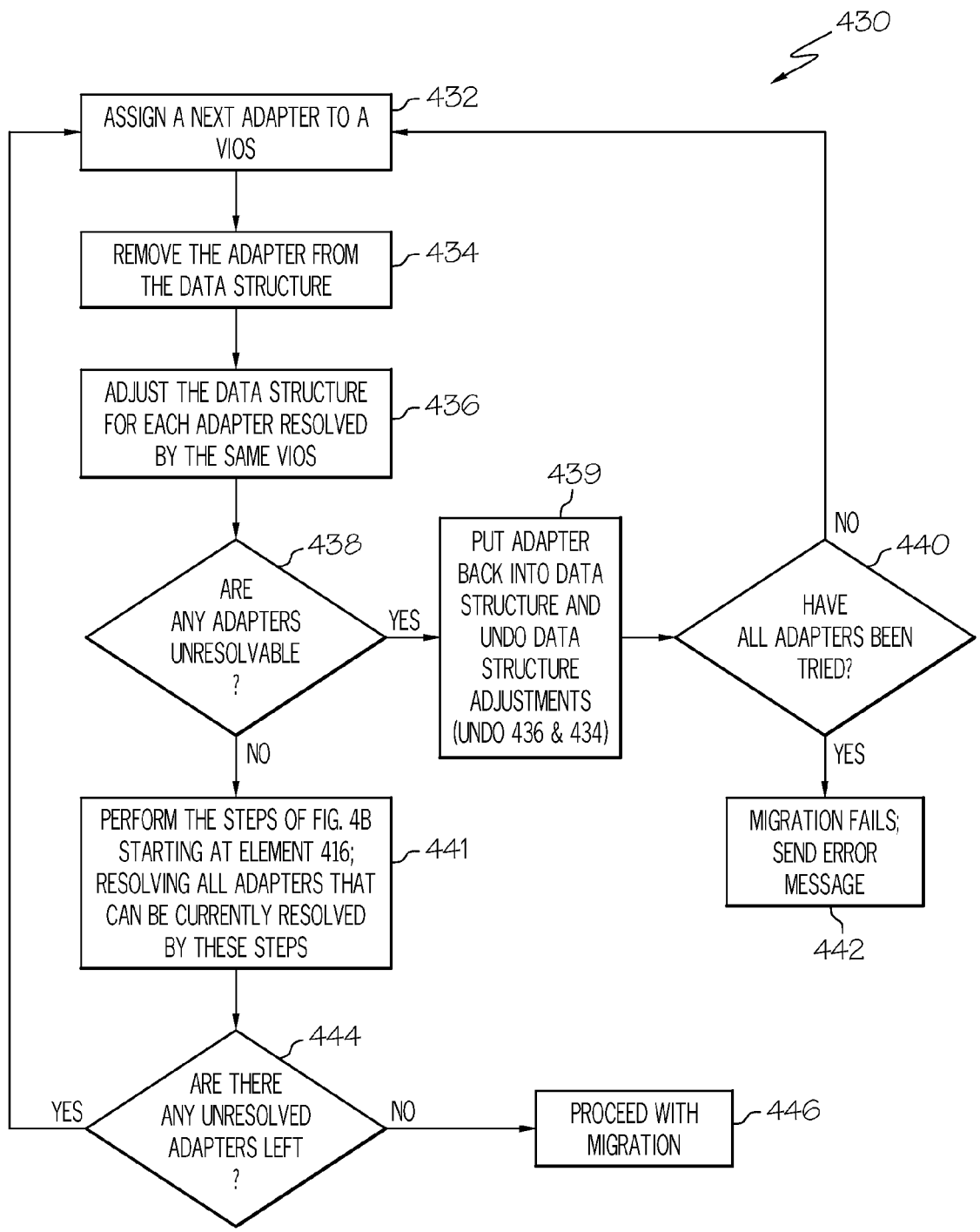
FIG. 4C depicts a flowchart of an embodiment for resolving additional adapters.

FIG. 4B shows a flow chart 412 for performing the primary tests implemented by the HMC. After testing the preliminary conditions (1) and (2) above, the HMC performs cleanup operations, removing non-functional VIOS hosts from the data structure (element 414). Then, the HMC tests for the two primary conditions a) and b) restated below.

a) (element 416) While there exists an adapter that can be resolved by just a single VIOS host, do the following:
(element 420) Resolve the adapter to that destination VIOS.
(element 422) Remove the adapter from the data structure and perform adjustments A for other remaining adapters resolved by the same VIOS,
In some embodiments, the system will at this point re-perform the steps of FIG. 4A to check for unresolvable adapters in the current data structure.

b) (element 418) While a VIOS host exists with weight<=0, do the following:
(element 424) Resolve all adapters hosted by this VIOS host.
(element 426) Remove the adapters from the data to be resolved and perform adjustments B for other VIOS hosts that could have also resolved the same adapters.
In some embodiments, the system will at this point re-perform the steps of FIG. 4A to check for unresolvable adapters in the current data structure.

Note: No adjustments in the VIOS weight checking loop could have caused an adapter with a single possible VIOS again, so once the weight checking loop is finished, all possible clear adapter resolutions have been performed and the process proceeds as follows.

At this point, if there are some adapters not yet resolved, and there are no given resolution paths for these adapters, that is, there are currently no more adapters that can be resolved according to the two primary conditions a) and b), then a point has been reached where all the adapters remaining have two or more possible VIOS hosts and no VIOS has a weight value less than or equal to zero (in other words, there is no potential destination VIOS host that has enough slots available to resolve its whole list of possible unresolved adapters).

Before beginning the traversal of the remaining adapters in the data structure, the system may order them in ascending order of these two values: Number of possible hosts per adapter, then weight per VIOS host. This is easy to do since the data is stored in a data structure. Thus, the system traverses this data structure, starting with the first adapter in the list. Then, if all adapters can't be resolved successfully from this starting point (for example, if the process is blocked (unable to resolve an adapter), the process then starts again with the next adapter in the list, finishing with the first adapter. We continue this process until either we succeed to resolve all the adapters, or until we've exhausted all starting points and have been blocked with each one, resulting in failure.

After testing for the two primary conditions a) and b), one may assign an adapter to any one of the hosts that will resolve it. Thus, in some embodiments, steps are as shown in the flowchart 430 of FIG. 4C. While there still exists an unused starting point (an adapter not yet resolved), the following occurs:
(element 432) Resolve a next adapter to a VIOS host;
(element 434) Remove the adapter from the data to be resolved.
(element 436) Perform adjustments A for other remaining adapters resolved by the same VIOS.
(element 438) Test for the 'unresolvable' (failure) conditions (1) or (2) given above (see FIG. 4A).
(element 439) If at least one unresolvable adapter is found then we have hit failure conditions (1) or (2): there is no possible VIOS for the adapter or there is a possible VIOS but with 0 slots. Then we put the adapter back into the data structure and undo steps 434 and 436.

(element 440) If at least one unresolvable adapter is found we then determine if all adapters have been tried.

(element 432) If not all adapters have been tried, then try the next adapter.

(element 441) If, on the other hand, there are currently no unresolvable adapters (we have not hit failure conditions (1) and (2)), then test for the two primary conditions a) and b) given above (see FIG. 4B starting at element 416); resolve all adapters that can be resolved according to the primary conditions a) and b), and make adjustments accordingly.

(element 444) Determine if there are any remaining unresolved adapters that can possibly still be resolved. If so, then assign a next adapter to a VIOS (element 430) and continue.

(element 446) If all adapters have been resolved, then proceed with the migration.

Normally, an exhaustive combination search could potentially result in an unacceptable performance impact. The goal is that the number of steps required to exhaust all possible combinations will have been greatly diminished by resolving as many adapters as possible in the iterative process of resolving all adapters. The method will become clear by applying these steps to the example given above.

Therefore, continuing with the example above, according to the steps outlined above, the system first processes all resolvable adapters where the number of possible VIOS hosts is 1 and perform adjustments for other adapters resolved by the same VIOS. The table now looks as follows:

| A ADAPTER | B # Possible VIOS Hosts | C Possible # of adapters per VIOS | D Available slots per VIOS host | E Weight per VIOS host (E = C - D) |
|---|---|---|---|---|
| ~~a2~~ | ~~1~~ | ~~3(d3)~~ | ~~2(d3)~~ | ~~1(d3)~~ |
| ~~a4~~ | ~~1~~ | ~~5(d2)~~ | ~~2(d2)~~ | ~~3(d2)~~ |
| a0 | 2 | 3(d1) | 1(d1) | 2(d1) |
|  | 2 | ~~5~~4(d2) | ~~2~~1(d2) | 3(d2) |
| a1 | 2 | ~~5~~4(d2) | ~~2~~1(d2) | 3(d2) |
|  | 2 | 2(d4) | 2(d4) | 0(d4) |
| a3 | 2 | 3(d1) | 1(d1) | 2(d1) |
|  | 2 | ~~5~~4(d2) | ~~2~~1(d2) | 3(d2) |
| a6 | 2 | ~~5~~4(d2) | ~~2~~1(d2) | 3(d2) |
|  | 2 | ~~3~~2(d3) | ~~2~~1(d3) | 1(d3) |
| a5 | 3 | 3(d1) | 1(d1) | 2(d1) |
|  | 3 | ~~3~~2(d3) | ~~2~~1(d3) | 1(d3) |
|  | 3 | 2(d4) | 2(d4) | 0(d4) |

Adapters a2 and a4 are assigned to d3 and d2 respectively and are removed from the data structure. In column C, the possible number of adapters per VIOS for these two destination hosts is reduced by one. In column D, the available slots per VIOS for these two destination hosts is reduced by one. These are the adjustments A referred to above.

Next, we resolve all adapters that can be hosted by a destination VIOS that has at least enough available slots to host all of its possible adapters. This will be the case where the weight is less than or equal to zero. Then we perform adjustments B for other VIOS hosts that could have resolved the same adapters. The data structure now looks as follows:

| A ADAPTER | B # Possible VIOS Hosts | C Possible # of adapters per VIOS | D Available slots per VIOS host | E Weight per VIOS host (E = C - D) |
|---|---|---|---|---|
| a0 | 2 | ~~3~~2(d1) | 1(d1) | ~~2~~1(d1) |
|  | 2 | ~~4~~3(d2) | 1(d2) | ~~3~~2(d2) |
| ~~a1~~ | ~~2~~ | ~~4(d2)~~ | ~~1(d2)~~ | ~~3(d2)~~ |
|  | ~~2~~ | ~~2(d4)~~ | ~~2(d4)~~ | ~~0(d4)~~ |
| a3 | 2 | ~~3~~2(d1) | 1(d1) | ~~2~~1(d1) |
|  | 2 | ~~4~~3(d2) | 1(d2) | ~~3~~2(d2) |
| a6 | 2 | ~~4~~3(d2) | 1(d2) | ~~3~~2(d2) |
|  | 2 | ~~2~~1(d3) | 1(d3) | ~~1~~0(d3) |
| ~~a5~~ | ~~3~~ | ~~3(d1)~~ | ~~1(d1)~~ | ~~2(d1)~~ |
|  | ~~3~~ | ~~2(d3)~~ | ~~1(d3)~~ | ~~1(d3)~~ |
|  | ~~3~~ | ~~2(d4)~~ | ~~2(d4)~~ | ~~0(d4)~~ |

Since a1's possible VIOS hosts also included d2, and since a5's possible VIOS hosts also included d1 and d3, we reduce these destination hosts' possible number of adapters. Thus, the possible number of adapters corresponding to VIOS hosts d1, d2, d3 and d4 are reduced by one, and the weights are recalculated accordingly.

We now repeat these steps for adapter a6, which now has a weight of 0. The table now appears as follows:

| A ADAPTER | B # Possible VIOS Hosts | C Possible # of adapters per VIOS | D Available slots per VIOS host | E Weight per VIOS host (E = C - D) |
|---|---|---|---|---|
| a0 | 2 | 2(d1) | 1(d1) | 1(d1) |
|  | 2 | ~~3~~2(d2) | 1(d2) | ~~2~~1(d2) |
| a3 | 2 | 2(d1) | 1(d1) | 1(d1) |
|  | 2 | ~~3~~2(d2) | 1(d2) | ~~2~~1(d2) |
| ~~a6~~ | ~~2~~ | ~~3(d2)~~ | ~~1(d2)~~ | ~~2(d2)~~ |
|  | ~~2~~ | ~~1(d3)~~ | ~~1(d3)~~ | ~~0(d3)~~ |

We have by this point completed resolution of the following adapters: d2(a4), d3(a2,a6), d4(a1,a5). The table now looks as follows:

| A ADAPTER | B # Possible VIOS Hosts | C Possible # of adapters per VIOS | D Available slots per VIOS host | E Weight per VIOS host (E = C - D) |
|---|---|---|---|---|
| a0 | 2 | 2(d1) | 1(d1) | 1(d1) |
|  | 2 | 2(d2) | 1(d2) | 1(d2) |
| a3 | 2 | 2(d1) | 1(d1) | 1(d1) |
|  | 2 | 2(d2) | 1(d2) | 1(d2) |

The remaining as-yet-unassigned adapters, a0 and a3, must now be assigned. (Note, these adapters are not clearly 'resolvable' according to primary conditions a) and b) (as illustrated by FIG. 4B), so we apply the 'resolve next adapter' approach illustrated by FIG. 4C. For example, a0 may be assigned to d1 or d2. Suppose we choose to assign adapter a0 to VIOS d1. Then the data structure is as follows:

| A ADAPTER | B # Possible VIOS Hosts | C Possible # of adapters per VIOS | D Available slots per VIOS host | E Weight per VIOS host (E = C - D) |
|---|---|---|---|---|
| ~~a0~~ | ~~2~~ | ~~2(d1)~~ | ~~1(d1)~~ | ~~1(d1)~~ |
|  | ~~2~~ | ~~2(d2)~~ | ~~1(d2)~~ | ~~1(d2)~~ |
| a3 | ~~2~~ | ~~2(d1)~~ | ~~1(d1)~~ | ~~1(d1)~~ |
|  | ~~2~~1 | ~~2~~1(d2) | 1(d2) | ~~1~~0(d2) |

Clearly, we complete the process of resolving all adapters to a destination VIOS by assigning a3 to d2. Final resolutions are as follows: d1(a0), d2(a4, a3), d3(a2, a6), d4(a1, a5).

One embodiment, therefore, is a system for allocating adapters associated with a client partition to VIOS hosts of a destination server to which the client is to be migrated. The system may be a system such as system 116 shown in FIG. 1. The system comprises a memory to store a data structure. The data structure comprises, for each adapter and for each VIOS host that may possibly support the adapter, the number of possible VIOS hosts per adapter, the number of adapters per VIOS, the number of available slots per VIOS, and a weight which is equal to the number of adapters per VIOS minus the number of available slots per VIOS. The system also comprises a processor to assign adapters to VIOS hosts and to maintain the data structure according to a set of rules. The rules comprise: (a) if an adapter can be resolved by only one VIOS, then assigning the adapter to the one VIOS, reducing by one the possible number of adapters for that VIOS, and reducing by one the number of available slots for the VIOS to which it was resolved; and (b) if a weight value is less than or equal to zero for a particular VIOS, then assigning all adapters possibly hosted by that VIOS to that particular VIOS, then for each of those now-resolved adapters that could have possibly been hosted by another VIOS—reducing by one those other VIOS hosts' possible number of adapters, and recalculating those other VIOS hosts' weight.

The set of rules may further comprise resolving an adapter that remains unresolved after the application of rules (a) and (b). In some embodiments, resolving an adapter that remains unresolved further comprises arbitrarily assigning the unresolved adapter to any one of a plurality of VIOS hosts that can host it. The set of rules may further comprise, after arbitrarily resolving an adapter that remained unresolved after the application of rules (a) and (b), repeating the application of rule (a) and then rule (b). The system may further comprise repeating the application of rule (a) until there is no longer an adapter that can be resolved by only one VIOS. The system may further comprise repeating the application of rule (b) until there is no combination of adapter and VIOS for which the weight is less than or equal to zero.

Another embodiment is a method for allocating adapters of a client to be migrated to a destination server having one or more destination VIOS hosts that can possibly host one or more of the adapters. The method comprises providing a data structure. The data structure comprises, for each adapter and for each VIOS host that may possibly support the adapter, the number of possible hosts per adapter, the number of adapters per VIOS, the number of available slots per VIOS, and a weight that is equal to the number of adapters per VIOS minus the number of available slots per VIOS. The method comprises determining, for an adapter if there is only one VIOS that can host the adapter. If so, then we assign the adapter to the one VIOS, reduce by one the possible number of adapters for the one VIOS, and reduce by one the available slots of the one VIOS. The method further comprises determining if a weight for a particular VIOS host is zero or less than zero. If so, then we assign the adapters possibly hosted by that VIOS to that particular VIOS host; reduce by one the possible number of adapters for any other VIOS host that could also have resolved any of those adapters; and recalculate a weight for those other VIOS hosts. (Note: there's no need to adjust numbers anymore for the VIOS to which we've just resolved all of its possible adapters, since it's now hosting all of the adapters it could possibly host—and it's removed from the data structure.)

The method may further comprise attempting to resolve a remaining unresolved adapter by assigning it to any one of the more than one VIOS hosts that can host it. In some embodiments, an error message is sent if attempting to resolve all adapters fails. The method may further comprise, after resolving a remaining unresolved adapter, repeating the tests for primary conditions a) and b). In some embodiments, the method comprises repeating the test for condition a) until there is no other adapter that has only one host that can resolve it. The method may also comprise repeating the test for condition b) until there is no other adapter having a weight of zero for a VIOS.

Some embodiments can take the form of an entirely hardware embodiment, an entirely software embodiment or an embodiment containing both hardware and software elements. Some embodiments are thus implemented in software, which includes but is not limited to firmware, resident software, microcode, etc. Furthermore, embodiments can take the form of a computer program product accessible from a machine accessible readable medium providing program code for use by or in connection with a server such as shown in FIG. 1, or any instruction execution system. For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment of the invention provides a computer program product containing instructions effective, when executing in a data processing system, to cause the system to perform a series of operations for assigning adapters to destination VIOS hosts. The operations comprise maintaining a data structure in a memory of the computer. The data structure comprises, for each adapter of a client to be migrated from a source server to a destination server and for each VIOS host of the destination server that may possibly support the adapter, the number of VIOS hosts per adapter, the number of adapters per VIOS, the number of available slots per VIOS, and a weight that is equal to the number of adapters per VIOS minus the number of available slots per VIOS. The operations comprise performing the following steps:

(a) if an adapter can be resolved by only one VIOS, then assigning the adapter to the one VIOS, reducing by one the possible number of adapters for the VIOS, and reducing by one the number of available slots for the VIOS; or (b) if a weight of a VIOS is less than or equal to zero for that particular VIOS, then assigning the adapter to the particular VIOS, reducing by one the possible number of adapters for the particular VIOS and for all other VIOS hosts that could have hosted the adapters, and recalculating weights for those VIOS hosts;

The operations may further comprise arbitrarily resolving an adapter that remains unresolved after the application of steps (a) and (b). The operations may further comprise, after resolving an adapter that remained unresolved after the application of rules (a) and (b), repeating the application of step (a) and then step (b). In other embodiments, the operations comprise repeating step (a) until there is no longer an adapter that can be resolved by only one VIOS. Similarly, the operations may comprise repeating step (b) until there is no combination of adapter and VIOS for which the weight is less than or equal to zero.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for allocating adapters of a client to be migrated to a destination server having one or more VIOS (Virtual Input/Output Server) hosts that can host one or more adapters, comprising:

creating a data structure stored in a computer memory comprising: for each adapter and for each VIOS host that can support the adapter, the number of VIOS hosts per adapter, the number of adapters per VIOS host, the number of available slots per VIOS host, and a weight that is equal to the number of adapters per VIOS host minus the number of available slots per VIOS host; and determining by a computer processor from the data structure stored in memory, for an adapter if there is but one VIOS host that can host the adapter, and if so:
assigning the adapter to the one VIOS host;
reducing by one the possible number of adapters for the one VIOS host;
reducing by one the available slots of the one VIOS host; and determining by the computer processor from the data structure stored in memory if a weight value for a particular VIOS host that can host one or more of the adapters is zero or less than zero and if so:
assigning all the adapters that can be hosted by that VIOS host to that particular VIOS host;
reducing by one, for all of the resolved adapters, the possible number of adapters for any other VIOS host that could also have resolved those adapters;
recalculating a weight value for the other VIOS hosts that could have resolved the resolved adapters.

2. The method of claim 1, further comprising attempting to resolve a remaining unresolved adapter by assigning it to any one of the more than one VIOS hosts that can host it.

3. The method of claim 2, further comprising returning an error message if attempting to resolve all adapters fails.

4. The method of claim 2, further comprising: after resolving a remaining unresolved adapter, repeating the steps of determining if but one VIOS host can host an adapter and determining if a weight is less than or equal to zero for a particular VIOS host.

5. The method of claim 1, further comprising: repeating the step of determining if there is but one VIOS host to host the adapter, until there is no other adapter that has only one host that can resolve it.

6. The method of claim 1, further comprising: repeating the step determining if a weight is zero or less until there is no other VIOS host having a weight of zero or less.

7. The method of claim 1, further comprising: storing the data structure in memory allocated to a hardware management console.

8. The method of claim 1, further comprising: making a copy of the data structure to determine hypothetical solutions to the problem of mapping all the adapters to the VIOS hosts.

9. The method of claim 1, further comprising: determining if there is an adapter that has zero possible VIOS hosts or if an adapter has only one possible VIOS host and that one possible VIOS host has zero available slots, and if one of these conditions is met, indicating that the migration fails.

10. A system for allocating adapters associated with a client to (Virtual Input/Output Server) VIOS hosts of a destination server to which the client is to be migrated, comprising:

a memory to store a data structure comprising: for each adapter and for each VIOS host that may possibly support the adapter, the number of VIOS hosts per adapter, the number of adapters per VIOS host, the number of available slots per VIOS host, and a weight which is equal to the number of adapters per VIOS host minus the number of available slots per VIOS host;

a processor to assign adapters to VIOS hosts and to maintain the data structure according to a set of rules that includes:

if an adapter can be resolved by only one VIOS host, then assigning the adapter to the one VIOS host, reducing by one the possible number of adapters for the VIOS host, and reducing by one the number of available slots for the VIOS host; and if a weight of is less than or equal to zero for a particular VIOS host, then assigning all the adapters that can be hosted by that VIOS host to that particular VIOS host, therefore resolving that VIOS host and all of its possible adapters, and reducing by one the possible number of adapters for all other VIOS hosts that could have hosted those adapters, and recalculating weights for those other VIOS hosts.

11. The system of claim 10, wherein the set of rules further comprises:
resolving an adapter that remains unresolved after the application of the first and second rules.

12. The system of claim 11, wherein resolving an adapter that remains unresolved further comprises arbitrarily assigning the unresolved adapter to any one of a plurality of VIOS hosts that can host it.

13. The system of claim 11, wherein the set of rules further comprises:
after resolving an adapter that remained unresolved after the application of the first and second rules, repeating the application of the first rule and the second rule.

14. The system of claim 10, wherein the processor further repeats the application of the first-listed rule until there is no longer an adapter that can be resolved by only one VIOS host.

15. The system of claim 10, wherein the processor further repeats the application of the second-listed rule until there is no combination of adapter and VIOS host for which the weight is less than or equal to zero.

16. The system of claim 10, wherein the processor further comprises applying the second listed rule before the first listed rule.

17. A computer program product comprising:
a computer readable device having a computer readable program, wherein the computer readable program when executed on a computer causes the computer to:
maintain a data structure in a memory of the computer comprising: for each adapter of a client to be migrated from a source server to a destination server and for each (Virtual Input/Output Server) VIOS host of the destination server that can support the adapter, the number of VIOS hosts per adapter, the number of adapters per VIOS host, the number of available slots per VIOS host, and a weight that is equal to the number of adapters per VIOS host minus the number of available slots per VIOS host; and
determining if an adapter can be resolved by but one VIOS host and if so, assigning the adapter to the one VIOS host, reducing by one the possible number of adapters for the VIOS host, and reducing by one the number of available slots for the VIOS host; and
determining if a weight is less than or equal to zero for a particular VIOS host and if so, assigning all the adapters that can be hosted by that VIOS host to that particular VIOS host, therefore resolving that VIOS host and all its possible adapters, and reducing by one the possible number of adapters for all other VIOS hosts that could have also hosted those adapters, and recalculating weights for those other VIOS hosts.

18. The computer program product of claim 17, further comprising:
resolving an adapter that remains unresolved after determining if an adapter can be resolved by but one VIOS host and after determining if a weight is less than or equal to zero.

19. The computer program product of claim 18, further comprising: after resolving an adapter that remained unresolved after the application of determining if there is but one VIOS host to host the adapter and after determining if a weight is less than or equal to zero.

20. The computer program product of claim 17, further comprising:
repeating the step of determining if there is but one VIOS host to host the adapter until there is no longer an adapter that can be resolved by only one VIOS host.

21. The computer program product of claim 17, further comprising:
repeating the step of determining if a weight is less than or equal to zero until there is no combination of adapter and VIOS host for which the weight is less than or equal to zero.

* * * * *